(12) United States Patent
Friesel (10) Patent No.: US 9,482,749 B1
(45) Date of Patent: Nov. 1, 2016

(54) SIGNATURE DETECTION IN POINT IMAGES

(75) Inventor: Mark A. Friesel, Ewing, NJ (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 1021 days.

(21) Appl. No.: 13/570,882

(22) Filed: Aug. 9, 2012

(51) Int. Cl.
G01S 13/68 (2006.01)
G01S 13/48 (2006.01)
G01B 7/30 (2006.01)
G01S 13/46 (2006.01)
G06K 9/00 (2006.01)

(52) U.S. Cl.
CPC ............ *G01S 13/68* (2013.01); *G01B 7/30* (2013.01); *G01S 13/48* (2013.01); *G01S 2013/468* (2013.01); *G06K 9/0063* (2013.01)

(58) Field of Classification Search
CPC ... G01S 2013/468; G01S 13/68; G01B 7/30; G01B 11/26; G01B 11/27; F41G 5/20
See application file for complete search history.

(56) References Cited

U.S. PATENT DOCUMENTS

| | | | | |
|---|---|---|---|---|
| 4,541,323 A * | 9/1985 | Sadler et al. | ............... | 89/41.14 |
| 5,208,418 A * | 5/1993 | Toth et al. | ................... | 89/41.07 |
| 6,037,896 A * | 3/2000 | Dekker | ......................... | 342/119 |
| 7,738,008 B1 * | 6/2010 | Ball | ................... | G06K 9/00214 |
| | | | | 348/159 |
| 8,570,211 B1 * | 10/2013 | Piesinger | ............ | G01S 13/9303 |
| | | | | 342/29 |
| 9,008,362 B1 * | 4/2015 | Friesel | ..................... | G01S 7/003 |
| | | | | 382/100 |
| 2005/0213109 A1 * | 9/2005 | Schell | ...................... | G01S 5/163 |
| | | | | 356/614 |
| 2008/0055157 A1 * | 3/2008 | Sahinoglu | ................ | G01S 5/04 |
| | | | | 342/450 |
| 2010/0231418 A1 * | 9/2010 | Whitlow | ............... | G01C 23/00 |
| | | | | 340/945 |
| 2014/0032124 A1 * | 1/2014 | Umer | .................... | A61B 5/1116 |
| | | | | 702/19 |
| 2014/0118183 A1 * | 5/2014 | Cho et al. | ....................... | 342/59 |

OTHER PUBLICATIONS

D.P. Huttenlocher & S. Ullman, "Object Recognition Using Alignment", 87 Proceedings of ICCV 102-111 (1987).*

(Continued)

*Primary Examiner* — David N Werner
(74) *Attorney, Agent, or Firm* — Howard IP Law Group, P.C.

(57) ABSTRACT

A method and system is disclosed for tracking object clusters that reduces the complexity of isotropic scaling and conformal transformations that are used with current methods of tracking clusters. The method and system comprise obtaining a first sensor image and a second sensor image. Then, angular measurements between objects of the first sensor image are determined. Next, the second sensor image is rotated to align it with the first sensor image, and then angular measurements between objects of the second sensor image are determined. Then angular measurements from the first sensor image are compared to angular measurements of the second image, and correlated object clusters are identified.

15 Claims, 5 Drawing Sheets

(56) References Cited

OTHER PUBLICATIONS

Y. Lamdan, J.T. Schwarz, & H.J. Wolfson, "Object Recognition by Affine Invariant Matching", 1988 Proceedings of the Computer Society Conference on Computer Vision & Pattern Recognition (CVPR '88) 335-344 (Jun. 1988).*

S. Avidan & A. Shashua, "Trajectory Triangulation: 3D Reconstruction of Moving Points from a Monocular Image Sequence", 22 IEEE Transactions on Pattern Analysis & Machine Intelligence 348-357 (Apr. 2000).*

K.H.H. Endresen, "Tracking Objects in 3D Using Stereo Vision", Nor. U. of Sci. & Tech. (Jun. 2010).*

J. Davis, D. Nehab, R. Ramamoorthi, & S. Rusinkiewicz, "Space-time Stereo: A Unifying Framework for Depth from Triangulation", 27 IEEE Transactions on Pattern Analysis & Machine Intelligence 296-302 (Feb. 2005).*

CRC Handbook, 25th Edition, 1979, p. 176.

* cited by examiner

SIGNATURE DETECTION IN POINT IMAGES

FIELD OF THE INVENTION

The invention relates to systems and methods for sensor tracking of objects, and more particularly to a system and method for detecting clusters of objects across independent sensors.

BACKGROUND OF THE INVENTION

Naval sensor systems often search space and track objects across independent sensors. If a cluster of objects is identified on a first sensor and another cluster of objects is identified on a second sensor, there is a need to determine whether that cluster of objects on the second sensor is the same as the cluster of objects identified on the first sensor. In that way, the total number of threats may be accurately assessed and tracked.

In general, current methods are known for tracking clusters of objects across different sensors. However, the known methods can be slow to implement because they require extensive calculation including isotropic scaling and conformal transformations such as Euclidean transformations. Thus, there is a need for a computationally simple technique for tracking clusters across independent sensors.

SUMMARY OF THE INVENTION

Naval search sensors often spot clusters of objects on different sensors. Cluster identification using high order distance metrics has been avoided because of calculational complexity. The disclosed method reduces the complexity of identifying clusters by comparing the clusters independent of range, which greatly simplifies the problem and allows a simple and easily calculated solution.

A method for tracking object clusters may comprise: obtaining a first sensor image having a plurality of first sensor image objects; obtaining a second sensor image having a plurality of second sensor image objects; determining first sensor image angular measurements for the plurality of first sensor image objects; rotating the second sensor image relative to the first sensor image; determining second sensor image angular measurements for the plurality of second sensor image objects from the rotated second sensor image; and then identifying correlated object clusters by comparing the first sensor image angular measurements to the second sensor image angular measurements. In an embodiment, rotating the second sensor image may comprise rotating the second sensor image to align a second sensor image range axis with a first sensor image range axis. Determining the first sensor image angular measurements may comprise determining angles formed by first sensor image triplets of objects and determining the second sensor image angular measurements may comprise determining angles formed by second sensor image triplets of objects.

In an embodiment, determining angles formed by the first sensor image triplets of objects may comprise calculating calculated first sensor image angles and determining angles formed by the second sensor image triplets of objects may comprise calculating calculated second sensor image angles. In another embodiment, determining angles formed by the first sensor image triplets of objects further may comprise deriving derived first sensor image angles and determining angles formed by the second sensor image triplets of objects may comprise deriving derived second sensor image angles.

The method for tracking object clusters may further comprise creating a first list containing first sensor image angular measurements for the first sensor image triplets of objects. The method for tracking object clusters may also comprise creating a second list containing second sensor image angular measurements for the second sensor image triplets of objects. In the method, comparing the first sensor image angular measurements to the second sensor image angular measurements may comprise comparing the first sensor image angular measurements in the first list to the second sensor image angular measurements in the second list. In an embodiment, the first sensor image triplets of objects and the second sensor image triplets of objects having matching angular measurements may be identified as correlated object clusters. The method may also comprise inferring inferred correlated object clusters based upon the correlated object clusters.

In an embodiment, comparing the second sensor image angular measurements to the first sensor image angular measurements may comprise comparing angular measurements of second sensor image triplets of objects to angular measurements of the first sensor image triplets of objects. The first sensor image triplets of objects and the second sensor image triplets of objects having matching angular measurements may be identified as correlated object clusters. The method may further comprise inferring inferred correlated object clusters based upon the correlated object clusters.

A method for tracking object clusters may comprise: obtaining a first sensor image having at least one first sensor image triplet of objects; obtaining a second sensor image having at least one second sensor image triplet of objects; determining first sensor image angular measurements for each first sensor image triplet of objects; rotating the second sensor image relative to the first sensor image; determining second sensor image angular measurements for each second sensor image triplet of objects from the rotated second sensor image; and identifying correlated object clusters by comparing the second sensor image angular measurements to the first sensor image angular measurements. Rotating the second sensor image may comprise rotating the second sensor image to align a second sensor image range axis with a first sensor image range axis.

A sensor system for tracking object clusters is also disclosed which may comprise a command and decision unit for: obtaining a first sensor image having a plurality of first sensor image objects; obtaining a second sensor image having a plurality of second sensor image objects; determining first sensor image angular measurements for the plurality of first sensor image objects; rotating the second sensor image relative to the first sensor image; determining second sensor image angular measurements for the plurality of second sensor image objects from the rotated second sensor image; and identifying correlated object clusters by comparing the first sensor image angular measurements to the second sensor image angular measurements. The sensor system may further comprise a communications unit for receiving a sensor image, and obtaining the second sensor image may comprise receiving the second sensor image via the communications unit.

BRIEF DESCRIPTION OF THE DRAWINGS

The details of the invention, both as to its structure and operation, may be obtained by a review of the accompanying drawings, in which like reference numerals refer to like parts, and in which.

DETAILED DESCRIPTION

Figure 1:
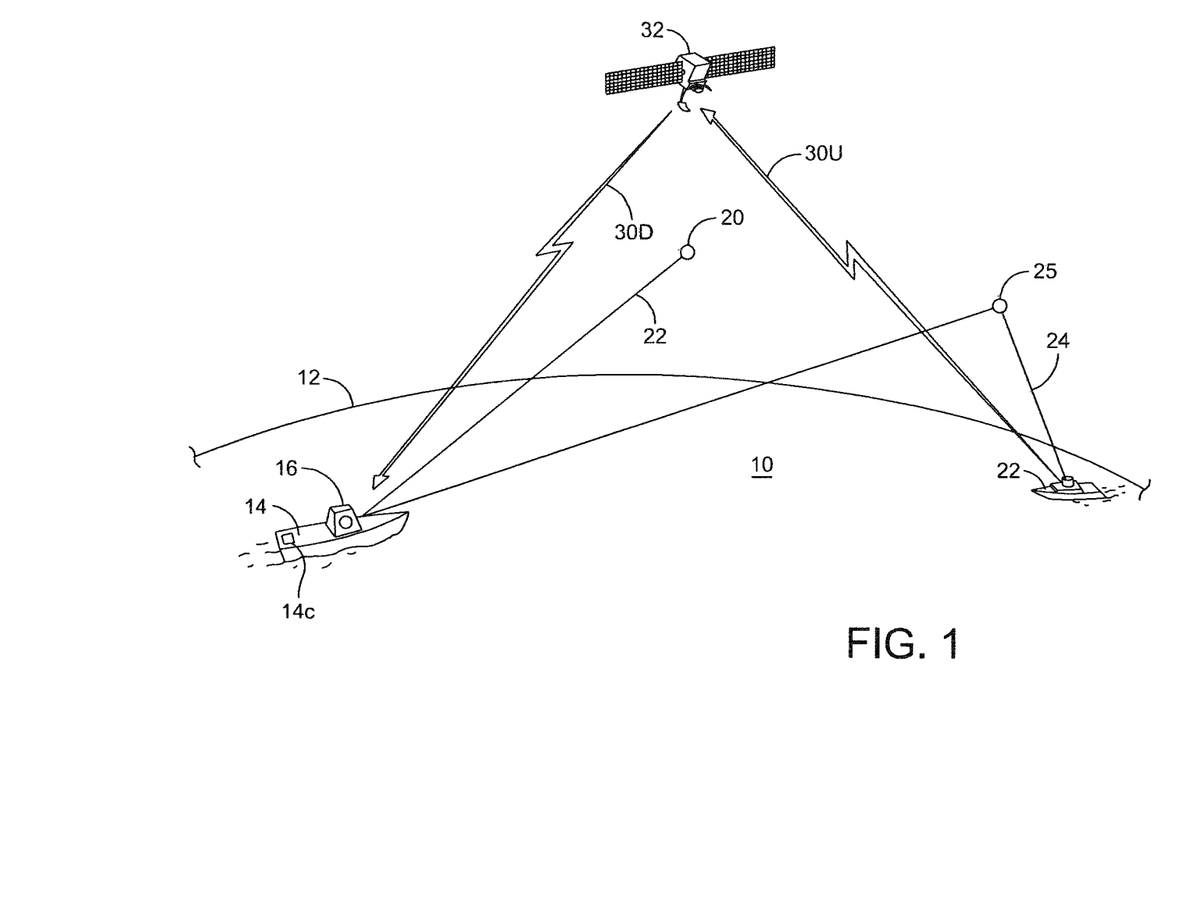
FIG. 1 is a representation of a sensor-equipped ship acquiring images of clusters of objects.

FIG. 1 shows a first ship 14 carrying a sensor system 16 or other sensor system, and a computer processor 14c. As will be understood, sensor system 16 may be any type of system capable of capturing images of object clusters, such as a radar system, an electro-optic infrared sensor system, or other two-dimensional or three-dimensional spatial sensor systems. A cluster of objects 20 is located by the first ship 14 along a line-of-sight 22 by the sensor system, and a sensor image of the first cluster is recorded into memory (not shown) by computer processor 14c. A second ship 22 also includes a sensor system (not shown), which may be a radar or other system, and a computer processor (not shown). An object cluster (or cluster of objects) 25 is located by the second ship 22 along a line-of-sight 24 by its sensor system, and an image of the second cluster is recorded by second ship 22 and is recorded to memory by a computer processor on the second ship. FIG. 1 shows object clusters 20 and 25 at different locations, which may be the case if the first ship and second ship see the same object cluster at different points in time or if the clusters are different clusters. If the first and second ship see the same object cluster at the same point in time, the cluster may be represented by a single cluster.

Figure 2:
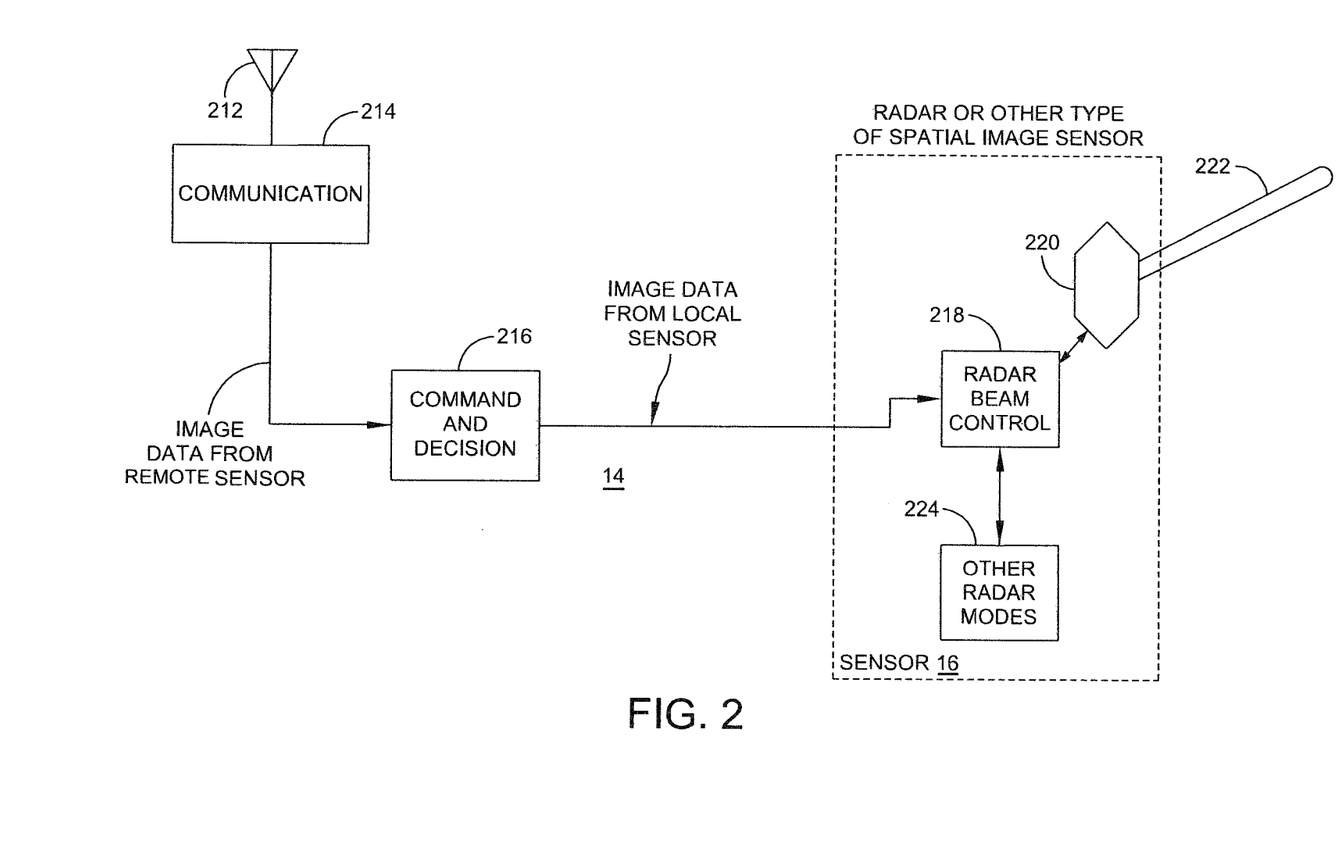
FIG. 2 is a simplified block diagram illustrating various shipboard functions relating to an embodiment including radar acquisition of images.

In FIG. 2, a first ship 14 includes a communications antenna 212 and communications unit 214 for communicating with other assets, including the communication represented in FIG. 1 by path 30D. This communication may include a radar image of cluster 25 observed by the radar of second ship 22. The communications unit 214 is coupled to a command and decision (C&D) unit 216. C&D unit 216 of the first ship 14 digitally processes radar images from the first ship and also from the second ship 22 in processor 14c, and from this processing determines whether the cluster of objects on the first ship's radar image contains some of the same objects as the cluster of objects on the second ship's radar image. Alternatively, second ship 22 may include the same equipment as the first ship, and may process a radar image it receives from the first ship as well as its own radar images.

The first ship 14 of FIG. 2 also includes coupling between the C&D unit 216 and the first ship's radar beam control unit 218, which may also be part of computer 14c. Radar beam control unit 218 commands the generation of transmit and receive beams by antenna face 220. These beams are "pencil beams," or narrow beams, as are known in the art. A representative pencil beam is illustrated as 222. The radar beam controller 218 of FIG. 2, together with the antenna face 220, produces sequential pencil beams in directions which, in conjunction with other pencil beams, search the sky for objects. A radar image of a cluster of objects is made through use of the radar system. The embodiment of FIG. 2 includes a radar system, however as noted herein, in other embodiments other types of sensor systems may be used with the invention.

Figure 3:
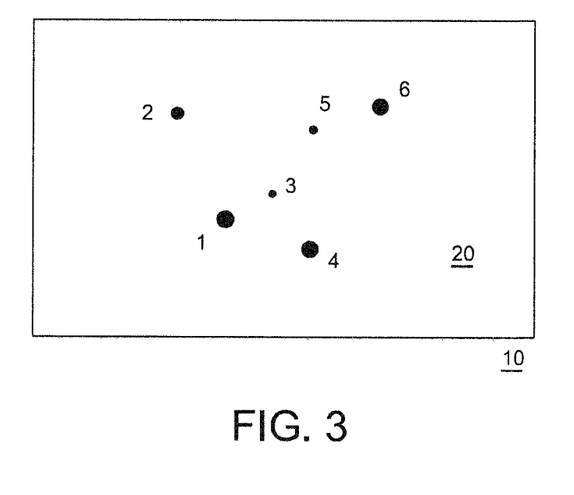
FIG. 3 is a representation of an image having a plurality of objects.

FIG. 3 shows an image 10 having a plurality of objects 20 numbered 1 through 6. The image may be captured by a radar or other type of sensor. Each of the points (which represent objects) has a position vector associated with it, as measured by the sensor, and a "triplet" or "triplet cluster" of objects may be defined from any three points in the sensor image. Generally, viewing the points in a radar image in terms of 3-point "triplet" clusters (such as a cluster made up of points 1, 2, and 3) and the angles (or angular measurements) created by the 3-point clusters (in this case the angle created by connected points 1 and 2 and points 2 and 3), the number of unique angles in all possible triplet clusters is represented by:

$$N = \sum_{j=1}^{n-1} (n-j)(n-2) \tag{1}$$

In the above formula, "N" is the number of unique triplet angles in all possible clusters, "n" is the number of points in the image, "j" is a variable that is incremented from 1 to n−1 in the summation. In counting the number of unique angles, angles that are repetitive are only counted once. For example, in the radar image of FIG. 3, the angle formed by 3-point cluster (1,2,3) is the same as the angle formed by the 3-point cluster (3,2,1), so that would only be counted as one unique angle. Applying the above formula to the radar image of FIG. 3 with 6 points (n=6), the total number of unique triplet angles is 60.

Figure 4:
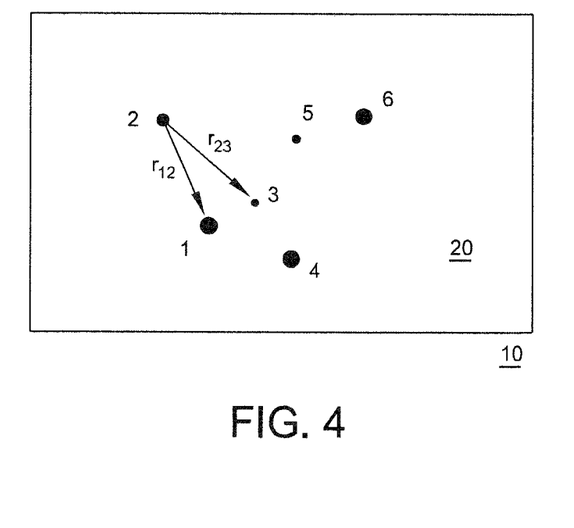
FIG. 4 is a representation of an angular measurement of a triplet of objects on an image.

FIG. 4 also shows an image 10 having a plurality of objects 20 numbered 1 through 6, and further shows a triplet of objects on an image. Specifically, FIG. 4 shows an angular measurement or angle between the triplet of objects 1, 2, and 3 of FIG. 1. The triplet is identified by the numbered objects (or points) that make up the triplet, hence the triplet including objects 1, 2, 3 is denoted as triplet (1,2,3), where the center point, here 2, of the triplet is the vertex of the triplet. The angle formed by the triplet (1,2,3) is determined from the vectors that are formed by the triplet, in this case $r_{12}$ and $r_{23}$, where "12" denotes the vector between points 1 and 2 and "23" denotes the vector between points 2 and 3, i.e.:

$$r_{jk} = r_k - r_j \tag{2}$$

The angle formed by triplet (i,j,k), denoted as "angle (i,j,k)," is then:

$$\text{Angle}(i,j,k) = \cos^{-1}(r_{ij} \cdot r_{jk} / r_{ij} r_{jk}) \tag{3}$$

All of the angles in all of the triplets formed within a radar image may be determined by calculating them using formulas 2 and 3.

Alternatively, once a basic set of angles is calculated for a number of triplets within an image, the remaining angles may be derived from the calculated angles using sums and differences. For example, for distant or closely-spaced objects where angles may be treated as planar, if angle (1,2,3) and angle (1,2,5) of the objects of FIG. 1 are known, the angle (3,2,5) may be easily calculated from those known angles:

$$\text{Angle}(3,2,5) = |(1,2,3) - (1,2,5)| \tag{4}$$

Where the angles between objects cannot be treated as planar, spherical triangle equations may be used to calculate or derive angles between triplets. Spherical triangle equations are well-known in the art and an example of the equations that may be used are disclosed in the CRC Handbook, 25th Edition, 1979, at page 176. Thus, in determining the angular measurements or angles of triplets within an image, some of the angles may be calculated and some angles will be derivable from the calculated angles. This fact may be used to minimize the number of calculations performed to determine the angles for all of the triplets of objects within an image. In addition, once the labels are applied the positions and angles may be updated from scene-to-scene such as by using velocity vectors and other image information.

Figure 5:
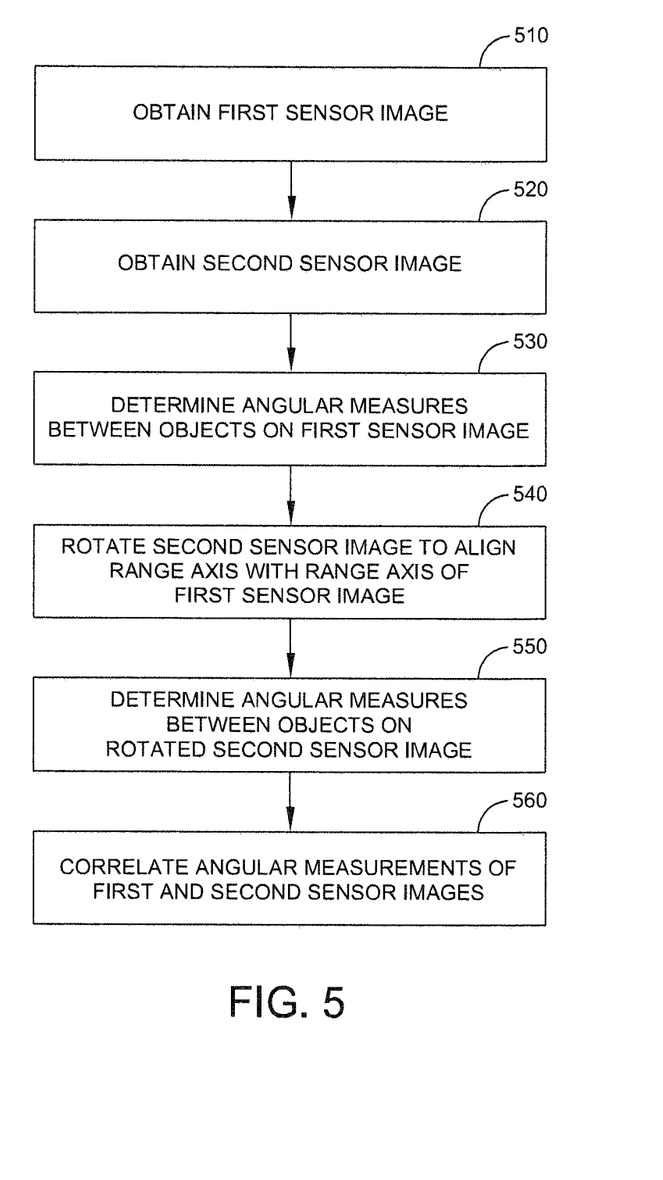
FIG. 5 is a flowchart illustrating steps for tracking clusters.

The flowchart of FIG. 5 shows an embodiment of a method or process for using triplet angles to determine whether clusters of objects in one sensor image correlate to clusters of objects in another sensor image. First, in block 510, a first sensor image in obtained, which contains a plurality of objects (a plurality of first sensor image objects). This image may be obtained by a local sensor or a remote sensor. In block 520, a second sensor image is obtained, which contains a plurality of objects (plurality of second sensor image objects). It too may be obtained by a local sensor or a remote sensor. In block 530, angular measurements between triplets of objects on the first sensor image (first sensor image angular measurements) are determined. As described in relation to FIG. 4, the angles formed by triplets may be determined by formulas (2) and (3) (calculated first sensor image angles). As also described in relation to FIG. 4, once a base set of angles is determined by formula, other angles may be determined by sums and differences (derived first sensor image angles).

Before angular measurements between triplets of the second sensor image (second sensor image angular measurements) may be determined, the second sensor image may be rotated to align its range axis (the second sensor image range axis) to the range axis of the first sensor image (the first sensor image range axis). This is performed in block 540 and may necessarily involve rotating the axes of the second sensor image. As will be understood, rotating the second sensor image to align its range axis with the first image may, for example, be performed when the images are 3-dimensional but only 2-dimensions are being evaluated, or when the relative rotation of the range vectors is small. If the range to targets in an image varies significantly and the rotation is large, 3-dimensional angle correlation methods may be appropriate to correlate the clusters in the first and second images.

Then at block 550, angular measurements between triplets of objects of the rotated second sensor image (second sensor image triplets of objects) are determined. As with the angular measurements of the first sensor image, some of the angular measurements of the second sensor image may be determined by formulas (2) and (3) (calculated second sensor image angles), and some may be determined by sums and differences (derived second sensor image angles). Finally, in block 560, angular measurements in the first sensor image are correlated to angular measurements in the second sensor image. In an embodiment, this is performed by comparing the angular measurements of triplets in the first sensor image (first sensor image triplets of objects) to angular measurements of triplets in the second sensor image (second sensor image triplets of objects). If certain angular measurements are identical or otherwise matching (identical or not perfectly identical but within an acceptable error) in both, that may indicate that the triplet of objects with that angular measurement in the first sensor image is the same triplet of objects with that angular measurement in the second sensor images. That is, the triplet of objects may be identified as a correlated triplet. The correlated triplet may also be identified as a correlated object cluster because a triplet is one form of an object cluster.

Figure 6:
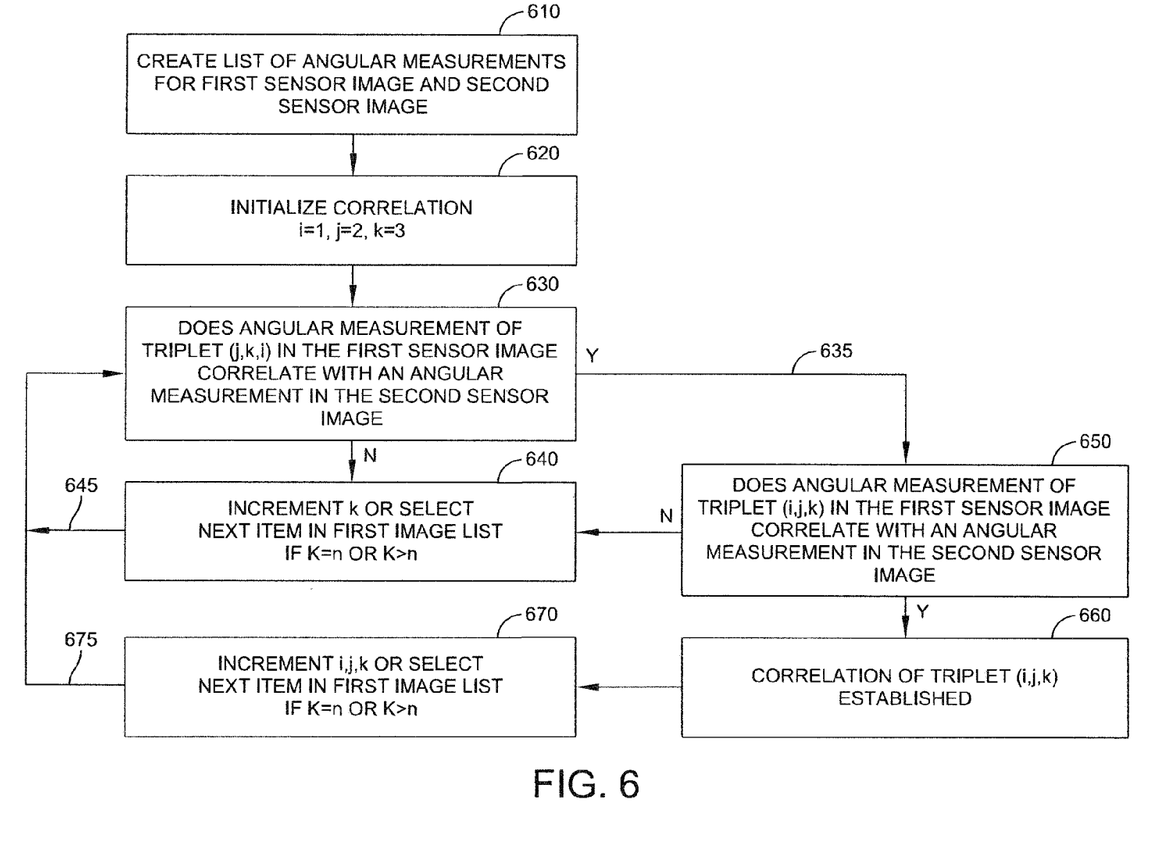
FIG. 6 is a flowchart illustrating steps for correlating clusters.

The flowchart of FIG. 6 shows an embodiment of a detailed method or process for correlating the angular measurements between a first and second sensor image to determine if any of the objects in the first and second image are the same objects. The embodiment of FIG. 6 uses a first list L1 of the unique angular measurements for the triplets of the first sensor image and a second list L2 of the unique angular measurements for the triplet of the second sensor image to perform the process. The details of determining the angular measurements is described in detail above in relation to FIG. 5.

In block 610, a list L1 of the unique angular measurements for the triplets of the first sensor image is created, and a separate list L2 of the unique angular measurements for the triplets of the second sensor image is created. In an embodiment, the list for a sensor image is created to include an entry for each unique angle formed by triplets within the sensor image. As shown in formula (1), the number of unique angles N may be calculated from the number of points n. The list may be created in a number of ways. In an embodiment, an initial angle in the list is represented as $(i,j,k)=(1,2,3)$, where 1, 2, and 3 represented numbered points or objects on the sensor image. The triplet (i, j, and k) represents a triplet within the sensor image of n points, and therefore none of i, j, or k may be greater than n, and $i \neq j \neq k$ in a triplet because a triplet has to have three different points. Subsequent entries are first created for the list by incrementing the k variable for all k>i, where k≠j, and making entries for those triplets. Next, entries are created for the list by incrementing the j variable from 1 to n (where j≠i), and making entries for those triplets. Last, entries are created by incrementally increasing i by 1 and making entries for those triplets, and repeating until $(i,j,k)=(n-1, n-2, n)$. This method will yield a list with N unique entries. As noted above in relation to FIG. 3, the angle formed by 3-point cluster (1, 2, 3) is the same as the angle formed by the 3-point cluster (3, 2, 1), so that would only be counted as one unique angle on the list.

After the lists are created, in block 620 the correlation is initialized by setting i=1, j=2, and k=3.

In block 630, the angular measurement of triplet (j,k,i) of the first sensor image is compared to the angular measurements of the triplets of the second sensor image in list L2. If the angular measurement of triplet (j,k,i) does not match any of the angular measurements of list L2, then the value of k is incremented so that k=k+1 in block 640, and then logic path 645 is followed back to block 630, and correlation of (j,k,i), where k now is k=k+1, is considered. In other words, a new triplet is considered for correlation because the original triplet (j,k,i) did not yield a correlation. Alternatively, if, incrementing k would result in k>n (where n is the maximum number of points in the image) then rather than increment k, the next element in the list L1 is considered for correlation. This is performed by identifying the next triplet in the list, and then setting i, j, and k according to the points that define the next triplet. Then logic path 645 is followed back to block 630, and correlation of that next element is considered.

If the correlation of triplet (j,k,i) in block 630 does result in a match to an angular measurement of List L2, then logic path 635 is followed to block 650. In block 650, correlation of triplet (i,j,k) of the first image is compared to the angular measurements of list L2. Block 650 effectively performs a check to make sure that triplet (j,k,i) is really correlated to a triplet of L2, by checking if the triplet (i,j,k) of the first sensor image is also correlated to a triplet of L2. By way of example, if angle of a triplet (1,2,3) of the first sensor image is found to correlate to an angle in list L2, then by necessity, the angle formed by triplet (2,3,1) will also correlate to an angle in list L2, if triplet (1,2,3) truly has a correlate in list L2. Thus, if a correlation between triplet (i,j,k) and an entry in List L2 is found in block 650, then processing proceeds to block 660 where correlation is confirmed.

After correlation is confirmed in block 660, a new triplet is selected for processing. This is done by incrementing i,j, and k so that i=j, j=k, and k=k+1. If, however, incrementing k would result in k>n (where n is the maximum number of points in the image) then rather than increment k, the next element in the list L1 is considered for correlation. As noted, this is performed by identifying the next triplet in the list, and then setting i, j, and k according to the points that define the next triplet. Then logic path 675 is followed back to block 630, and correlation of that next element is considered.

The process of FIG. 6 may also be represented by the following algorithm:
1. initialize i=1, j=2, k=3, Sol.=1,2
2. correlate (j,k,i) from first sensor image with angles from second sensor image
3. if correlation found for (j,k,i)
   a. correlate (i,j,k) from first sensor image with angles from second sensor image
   b. if correlation found for (i,j,k), set C=C+1, Sol.=Sol., k
      i. if k=N, go to next triplet element in list L1
      ii. otherwise set i=j, j=k, k=k+1
      iii. if k=j, then k=k+1
      iv. if k>n go to next triplet element in list L1
      v. return to statement 2 above
   c. if no correlation found for (i,j,k)
      i. if k=N, go to next triplet element in list L1
      ii. otherwise set k=k+1
      iii. if k=j, then k=k+1
      iv. if k>n go to next triplet element in list L1
      v. return to statement 2 above
4. if no correlation found for (j,k,i)
   a. if k=N, go to next triplet element in list L1
   b. otherwise set k=k+1
   c. If k=j, then k=k+1
   d. if k>n go to next triplet element in list L1
   e. return to statement 2 above (5)

In the algorithm, C is the number of correlated clusters, i.e., correlated triplets. Sol(ution) creates a list of targets contained in the cluster by appending each new correlated target to the list of previously correlated targets. If step 4d is triggered, then Sol is initialized with i, j of the next triple in L1.

The loop formed by the process of FIG. 6 (and algorithm (5)) is performed until all elements in List L1 have been evaluated. Notably, not all elements of List L1 need be directly evaluated against the elements of List L2 (as in block 630) to be considered "evaluated." That is, some triplets are implicitly correlated as a result of other triplets being evaluated, therefore their correlation may be inferred (inferred correlated triplets or object clusters). For example, if triplet (j,k,1) is expressly correlated as part of the evaluation process of FIG. 6 or algorithm (5), the when (1,j,k) is subsequently considered, its implicit correlation is known and may be inferred. Likewise, when a cluster is identified, all unevaluated angles in the cluster are implicitly correlated and may be inferred. As an example, a first sensor image has 6 points ($n_1$=6) and angles for the triplets (1,2,3), (2,3,4), (3,4,5), (4,5,6), (5,6,1) are correlated to angles of the second image. That being the case, triplets (1,2,4) and (1,4,5), and all of the angles of all other point permutations are also implicitly correlated, therefore correlation may be inferred and direct evaluation of those triplets as in block 630 is not required. Identifying implicitly correlated triplets that may be inferred from the evaluated triplets saves process time for the method of FIG. 6.

Although the process of FIG. 6 is shown in terms of lists, the correlation of triplets in the first image to triplets in the second image may be performed without lists. This may be accomplished by performing the algorithm (5) above by incrementing the k variable, and then performing the algorithm by incrementing the j variable.

The disclosed method described herein may be automated by, for example, tangibly embodying a program of instructions upon a computer readable storage media capable of being read by machine capable of executing the instructions. A general purpose computer is one example of such a machine, as are other known computing devices having processors, memory, hardware, software, and/or firmware. A non-limiting exemplary list of appropriate storage media well known in the art would include such devices as a readable or writeable CD, flash memory chips (e.g., thumb drives), various magnetic storage media, and the like.

The features of the method have been disclosed, and further variations will be apparent to persons skilled in the art. All such variations are considered to be within the scope of the appended claims. Reference should be made to the appended claims, rather than the foregoing specification, as indicating the true scope of the disclosed method.

The functions and process steps herein may be performed automatically or wholly or partially in response to user command. An activity (including a step) performed automatically is performed in response to executable instruction or device operation without user direct initiation of the activity.

The systems and processes of FIGS. 1-6 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The processes and applications may, in alternative embodiments, be located on one or more (e.g., distributed) processing devices accessing a network linking the elements of FIG. 1. Further, any of the functions and blocks provided in FIGS. 5 and 6 may be implemented in hardware, software or a combination of both and may reside on one or more processing devices located at any location of a network linking the elements of FIG. 1 or another linked network, including the Internet.

Furthermore, although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for correlating object clusters observed by independent sensors when tracking the object clusters, the method comprising:
   obtaining, by a first sensor, a first sensor image having a plurality of first sensor image point objects, each of the plurality of first sensor image point objects corresponding to a different object;
   obtaining, by a second sensor remotely located from the first sensor, a second sensor image having a plurality of second sensor image point objects, each of the plurality of second sensor image point objects corresponding to a different object;
   determining, by a command and decision unit, first sensor image angular measurements for the plurality of first sensor image point objects;
   rotating, by the command and decision unit, the second sensor image relative to the first sensor image to align the second sensor image range axis with the first sensor image range axis;
   determining, by the command and decision unit, second sensor image angular measurements for the plurality of second sensor image point objects from the rotated second sensor image;
   comparing, by the command and decision unit, the first sensor angular measurements and the second sensor angular measurements; and
   identifying, by the command and decision unit based solely on the comparison of the first sensor angular measurements and the second sensor angular measurements, one or more correlated point object clusters comprising point object clusters in the first sensor image which correlate with point object clusters in the second sensor image.

2. The method of claim 1, wherein
   determining the first sensor image angular measurements comprises determining angles formed by first sensor image triplets of point objects; and
   determining the second sensor image angular measurements comprises determining angles formed by second sensor image triplets of point objects.

3. The method of claim 2, wherein determining angles formed by the first sensor image triplets of point objects comprises calculating calculated first sensor image angles; and wherein determining angles formed by the second sensor image triplets of point objects comprises calculating calculated second sensor image angles.

4. The method of claim 3, wherein determining angles formed by the first sensor image triplets of point objects further comprises deriving derived first sensor image angles; and wherein determining angles formed by the second sensor image triplets of point objects comprises deriving derived second sensor image angles.

5. The method of claim 2, further comprising creating, by the command and decision unit, a first list containing first sensor image angular measurements for the first sensor image triplets of point objects.

6. The method of claim 5, further comprising creating, by the command and decision unit, a second list containing second sensor image angular measurements for the second sensor image triplets of point objects.

7. The method of claim 6, wherein comparing the first sensor image angular measurements to the second sensor image angular measurements comprises comparing the first sensor image angular measurements in the first list to the second sensor image angular measurements in the second list.

8. The method of claim 7, wherein the first sensor image triplets of point objects and the second sensor image triplets of point objects having matching angular measurements are identified as correlated object clusters.

9. The method of claim 8, further comprising inferring, by the command and decision unit, inferred correlated point object clusters based upon the correlated point object clusters.

10. The method of claim 2, wherein comparing the second sensor image angular measurements to the first sensor image angular measurements comprises comparing angular measurements of second sensor image triplets of point objects to angular measurements of the first sensor image triplets of point objects.

11. The method of claim 10, wherein the first sensor image triplets of point objects and the second sensor image triplets of point objects having matching angular measurements are identified as correlated point object clusters.

12. The method of claim 11, further comprising inferring, by the command and decision unit, inferred correlated point object clusters based upon the correlated point object clusters.

13. A method for correlating object clusters observed by independent sensors when tracking the object clusters, the method comprising:
   obtaining, from a first sensor, a first sensor image having at least one first sensor image triplet of point objects, each of the plurality of first sensor image point objects corresponding to a different object;
   obtaining, from a second sensor remotely located from the first sensor, a second sensor image having at least one second sensor image triplet of point objects, each of the plurality of second sensor image point objects corresponding to a different object;
   determining, by a command and decision unit, first sensor image angular measurements for each first sensor image triplet of point objects;
   rotating, by the command and decision unit, the second sensor image relative to the first sensor image to align a second sensor image range axis with a first sensor image range axis;
   determining, by the command and decision unit, second sensor image angular measurements for each second sensor image triplet of point objects from the rotated second sensor image;
   creating, by the command and decision unit, a first list containing first sensor image angular measurements for the first sensor image triplets of point objects;
   creating, by the command and decision unit, a second list containing second sensor image angular measurements for the second sensor image triplets of point objects;
   comparing the first sensor image angular measurements in the first list to the second sensor image angular measurements in the second list; and
   identifying, by the command and decision unit based solely on the comparison of the first sensor angular measurements in the first list to the second sensor angular measurements in the second list, correlated point object clusters comprising point object clusters in the first sensor image which correlate with point object clusters in the second sensor image.

14. A sensor system for correlating object clusters observed by independent sensors when tracking the object clusters comprising:
   a command and decision unit for:
      obtaining a first sensor image having a plurality of first sensor image point objects, each of the plurality of first sensor image point objects corresponding to a different object;
      obtaining, from a second sensor remotely located from the first sensor, a second sensor image having a plurality of second sensor image point objects, each of the plurality of second sensor image point objects corresponding to a different object;

determining first sensor image angular measurements for the plurality of first sensor image point objects;

rotating the second sensor image relative to the first sensor image to align the second sensor image range axis with the first sensor image range axis;

determining second sensor image angular measurements for the plurality of second sensor image point objects from the rotated second sensor image;

comparing the first sensor angular measurements and the second sensor angular measurements; and identifying, based solely on the comparison of the first sensor angular measurements and the second sensor angular measurements, correlated object clusters comprising point object clusters in the first sensor image which correlate with point object clusters in the second sensor image.

15. The system of claim 14, further comprising a communications unit for receiving a sensor image, and wherein obtaining the second sensor image comprises receiving, by the command and decision unit, the second sensor image via the communications unit.

\* \* \* \* \*